T. B. FOGARTY.

Carburetters.

No. 135,981. Patented Feb. 18, 1873.

Witnesses
S. H. Sibley
W. H. Fairbank

Inventor
Wm. B. Fogarty

UNITED STATES PATENT OFFICE.

THOMAS B. FOGARTY, OF WARREN, MASSACHUSETTS.

IMPROVEMENT IN CARBURETERS.

Specification forming part of Letters Patent No. 135,981, dated February 18, 1873.

*To all whom it may concern:*

Be it known that I, THOMAS B. FOGARTY, of Warren, in the county of Worcester and State of Massachusetts, have invented a certain Improvement in Gas-Machines, of which the following is a specification:

My invention relates to a new and improved form of cock or valve to be placed upon the gasoline-supply pipe of carbureters or gas-machines.

In gas-machines in which a cock or valve is made to shut off the supply of gasoline automatically it is essential that the valve should make a tight joint, and that it should be constructed so as to be capable of being entirely opened or closed by a slight movement of the actuating lever or handle. The ordinary globe-valve does not supply this want, because it requires four or five complete turns of the stem to open or close it entirely, and, as ordinarily constructed, the valve-opening is so large that when the valve rests upon its seat it necessarily bears upon a large surface, and consequently requires the application of considerable force to close it tightly; in addition to which it requires frequent packing around the stem, which is apt to be neglected by the inexperienced, and the consequence is a leak of gasoline, and probably a fire.

It is to obviate the above defects that I have devised the new and improved valve which I am about to describe, and which is shown full size in the annexed drawing.

Figure 1:
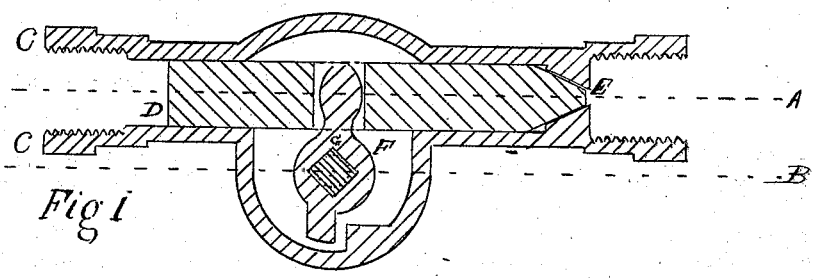
Figure 2:
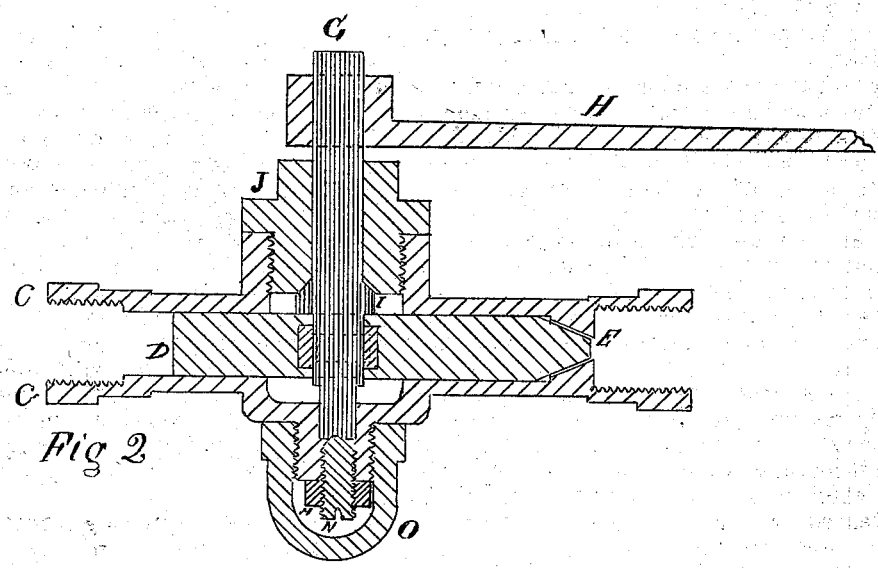
Figure 3:
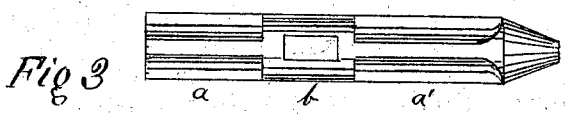

Figure 1 is a vertical longitudinal section. Fig. 2 is a horizontal longitudinal section of Fig. 1, showing sections thereof at the dotted lines A and B in the same plane. Fig. 3 is a plan of the valve D, Figs. 1 and 2.

In all the figures the same letters refer to the same parts.

C is the body of the valve, provided at E with a seat, against which the valve D bears, so as to form a tight joint when the valve is closed. D is fluted at the sides at $a$ and $a'$, Fig. 3, and is slotted at $b$ to receive the lever F. This lever is actuated by the rock-shaft G, which passes through it, and at its outer end carries the lever or handle H. It is evident that a very slight motion of this lever must completely open or close the valve. In order to dispense with the use of a stuffing-box and packing around the stem of the rock-shaft G, I provide it with a shoulder, I, ground tight into and working against a seat on the inner side of the plug J, against which it is pressed, so as to make a tight joint, by the set-screw H, provided with the lock-nut M, and the whole covered by the cap O, so as to prevent the possibility of leakage around the nut or screw.

I claim—

In automatic regulating carbureters or gas-machines, a gasoline-supply valve, constructed substantially as described.

THOS. B. FOGARTY.

Witnesses:
S. H. SIBLEY,
W. H. FAIRBANK.